3,288,758
STABLE POLYACETALDEHYDES AND PROCESS FOR THE PRODUCTION THEREOF
Maurice Joseph Amand Letort, Paris, and Bernard Fleureau, Verneuil-en-Halatte, France., assignors to Charbonnages de France, Paris, France, a public institution of France
No Drawing. Filed June 11, 1965, Ser. No. 463,355
Claims priority, application France, Apr. 21, 1960, 824,961; Nov. 9, 1964, 994,366
18 Claims. (Cl. 260—67)

The present application is a continuation-in-part of applicants' copending application Serial No. 101,640, filed April 19, 1961, now abandoned.

The present invention relates to elastomer polymers of acetaldehyde having high thermal stability and the method of obtaining them.

It is known that acetaldehyde polymerized by various methods such as crystallization, the action of borofluoride and the like, results in the formation of elastomer polymers. Unfortunately the thermal decomposition rate of these polymers even at temperatures in the range of 60–70° C. is very high, which prevents their being utilized industrially.

For a long time it was believed that the crystallization was necessary for forming polyacetaldehyde. It is now known that such is not the case and that the polymer can be obtained at temperatures much higher than that of crystallization.

Whatever the conditions in which they are prepared, known polymers always appear in the same way: rubbery white grains having a tendency to agglomerate. These polymers have excellent physical properties, making them suitable for valuable industrial applications. Unfortunately, they decompose easily under the action of heat or acids. Various attempts have already been made to increase the heat-resistance of polyacetaldehydes by the addition of products such as sodium carbonates or bicarbonates, amines, ureas, naphthols, hydroquinones, etc. Now, the present invention relates to polymers having greatly improved thermal stability compared with that of polymers produced by previous known methods, thus allowing for applications which it was not possible to envisage with the polymers known at present.

It is an object of the present invention to provide elastomers of polyacetaldehyde of high molecular weight, stabilized and stable up to a decomposition starting temperature of at least 85° C.

It is a further object of the present invention to provide elastomers of polyacetaldehyde of high molecular weight, improved in such a way that they are stabilized and remain stable up to a decomposition starting temperature of at least 125° C.

A still further object of the present invention is to provide novel processes for the thermal stabilization of elastomers of acetaldehyde of high molecular weight.

The present invention thus relates to a process for stabilizing acetaldehyde elastomers of high molecular weight having an original decomposition starting temperature of about 55° C. by intimately contacting the elastomers in an alkaline aqueous solution, such as alkaline metal hydroxides, carbonates and bicarbonates, and separating the elastomers thus treated to yield a stabilized elastomer having a decomposition starting temperature of at least 85° C. The alkaline metal compounds can be sodium, potassium lithium compounds.

The present invention also relates to a process for stabilizing acetaldehyde elastomers of high molecular weight by dissolving the elastomer in a solvent for the elastomer, allowing the resulting solution to stand at room temperature and then adding the alkaline aqueous solution in accordance with the previous paragraph. Examples of the solvent may be pyridine, dimethylformamide and acetone.

Acetaldehyde elastomers having even higher decomposition starting temperatures of at least 125° C. are obtained when acetic anhydride is added to the solution of the elastomer in the solvent before the treatment with the alkaline aqueous solution.

Elastomers of acetaldehyde which have been stabilized as indicated heretofore can be stabilized still further up to decomposition starting temperatures as high as 191° C. by a heat treatment step either in vacuum or in a stream of an inert gas.

It is known that it is possible to stabilize crystalline polymers of aldehydes such as butyraldehyde by heating. However; when this method is applied to polyacetaldehydes without taking special precautions, decomposition follows according to a law of first order and no stabilization occurs as was shown, for example, in United States Patent No. 3,001,966 of September 18, 1962.

Applicants have now discovered that, very surprisingly, polymers of acetaldehyde previously treated by an aqueous solution of carbonate, bicarbonate or hydroxide of an alkaline metal, and then heated in vacuum or in a stream of inert gas, no longer decompose according to a law of first order and give new polymers of acetaldehyde having great thermal stability.

Acetaldehyde polymers are stabilized by a process in accordance with the present invention by applying the following operation procedure: immediately after being prepared, the polyacetaldehyde is placed in the solvent. It swells slowly and must be left until complete dissolution occurs (generally several hours). In some of the examples, the polymer put into solution in the solvent is treated with acetic anhydride. Generally, equal volumes of acetic anhydride and solvent are used, but the volume ratio is not critical.

The treatments are carried out under nitrogen to prevent oxidation reactions and with stirring to facilitate contact between the reactants.

At the end of the time selected as reaction duration, the polymer solution is poured into a solution of the alkaline material in order to ensure, on the one hand, the precipitation with water of polymer and, on the other hand, the neutralization, if required, of the acetic anhydride. The polyacetaldehyde is thereafter recovered and subjected to thorough washing in water.

The crude or unstable polyacetaldehyde may be treated with the solution of carbonate, bicarbonate or hydroxide of an alkaline metal, by submitting it to energetic washing, preferably with a turbo-stirrer or other apparatus ensuring efficient grinding and stirring without the use of the solvent.

Polymers of acetaldehyde which may be treated according to the invention include all polyacetaldehydes whether or not they have been structurally modified, as for example, by treating by means of a carboxylic anhydride such as acetic anhydride.

The temperature of the heat treatment step is selected in order that degradation does not occur too rapidly to be controlled or too slowly to result in stabilization in a reasonable length of time. In general, temperatures of from 100 to 300° C. meet these requirements. The length of treatment will be a function of the temperature and the degree of thermal stability desired, stabilization only being obtained by the loss of part of the polyacetaldehyde.

Products stabilized by heat treatment in this manner undergo a loss of weight of less than 6%, and even of less than 1% per hour when they are heated to 138° C. in an inert atmosphere. Here, as in the description which follows, the expression "loss of weight per hour" means a loss of weight observed on the sample after heating at the temperature given for one hour.

The full significance and advantages of the invention will be apparent from the following examples wherein the decomposition starting temperature (D.S.T.) is that at which the polymer has lost 0.025% of its initial weight when a sample of polymer is heated in a furnace of which the regulating system is such that the temperature increases in accordance with a linear law as a function of time, the heating rate being adjusted to 1° C. per minute and the test being carried out in a nitrogen atmosphere.

Another standard for measuring thermal stability of the polyacetaldehyde elastomers, is determining rate constants for the thermal degradation reaction at temperatures such as 138° C. and 160° C. The procedure followed in making the determinations of rate constant was as follows:

A sample of polyacetaldehyde elastomer was placed in a vessel and weighed. The air in the vessel was displaced by nitrogen. The vessel was then placed in a furnace provided with a regulating system and using controlling balances. The temperature of the furnace is maintained constant at the temperature being measured, e.g. 138° C. or 160° C., for a predetermined time in a nitrogen stream. The vessel is weighed. By repeating the experiment for different intervals of time and calculating the weight percent remaining with time and plotting the log percent remaining against time, one derives a curve whose slope defines the rate constant for thermal degradation. This may be expressed mathematically by the equation:

$$k_t \text{ in percent per mn.} = 2.3 \frac{\log p_0 - \log p_1}{(t_1 - t_0) \text{ in mn.}} \times 100$$

where $p_0$=percentage of weight remaining at time $t_0$
where $p_1$=percentage of weight remaining at time $t_1$.

In the case of polyacetaldehyde elastomers which have not been treated in accordance with the present invention, the $k$ is first order, whereas for polyacetaldehyde elastomers stabilized in accordance with the present invention do not decompose according to a law of first order.

EXAMPLE 1

A pure acetaldehyde monomer was prepared by decomposition of paraldehyde occurring at about 80° C. in the presence of traces of phosphoric or sulfuric acid. The vapors flow through a column packed with refractory materials externally cooled with water so as to ensure the reflux of the entrained paraldehyde.

The crude monomer thus obtained was then distilled in a packed column under a slight nitrogen pressure and purified (by being passed over copper dispersed on Kieselguhr and heated to 180° C.) to preclude any risk of oxidation.

The thus-purified monomer was cooled to a temperature slightly lower than its freezing point (−123.3° C.) and thereafter reheated. A gelatinous mass of polyacetaldehyde swollen with monomer was obtained. The polymer was washed with petroleum ether to drive out the monomer and a rubbery, only slightly sticky, white polyacetaldehyde was recovered.

The yield was of about 25%.

40 parts of this polymer were dissolved in 600 parts of pyridine over 21 hours. Then, the polymer was precipitated by adding 2000 parts of an aqueous solution of sodium carbonate. The polymer formed was recovered and thoroughly washed with water.

The decomposition starting temperature of the product obtained was 105° C.

EXAMPLE 2

Monomer acetaldehyde is prepared by decomposing paraldehyde at a temperature of about 80° C. in the presence of traces of concentrated sulphuric acid. The monomer obtained is purified by distillation in a filling column under slight pressure of nitrogen.

The monomer thus purified contains traces of acid and is cooled to a little below its freezing point (−123.3° C.) and then warmed. A gelatinous mass of crude polyacetaldehyde swollen with monomer is obtained. This crude polymer is divided into three fractions which are freed from their monomer by washing in a turbo-stirrer, changing the washing liquid 5 times and using on each occasion 500 parts by weight of this liquid per part by weight of polymer; the first fraction is washed with demineralized water, the second fraction with petroleum ether and the third with carbonated water containing 20 g. of $Na_2CO_3 \cdot 10H_2O$ per litre.

The three samples are dried in vacuum at room temperature for 24 hours; the yield in polymer with respect to the initial monomer is about 40%.

The decomposition starting temperature test was carried out on a fraction of each sample and the following results were obtained:

Polymer washed with demineralized water, D.S.T.=57° C.
Polymer washed with petroleum ether, D.S.T.=55° C.
Polymer treated with sodium carbonate, D.S.T.=100° C.

EXAMPLE 3

(A) The starting polymer obtained as in Example 2 is divided into two fractions one of which is treated by 50 parts by weight of an aqueous solution at 5 g. per litre of $NaHCO_3$ per part by weight of polymer, and the other fraction by the same quantity of an aqueous solution at 5 g./litre of $K_2CO_3$. After drying in vacuum at room temperature for 24 hours, a sample of the fraction treated by $NaHCO_3$ gives a D.S.T. of 100° C. and a sample of the fraction treated by $K_2CO_3$ gives a D.S.T. of 90° C.

(B) Example 3(A) is repeated using $Li_2CO_3$ and LiOH instead of $K_2CO_3$ and $NaHCO_3$ respectively.

The polymer treated by $Li_2CO_3$ has a decomposition starting temperature of 85° C.

The polymer treated by LiOH has a decomposition starting temperature of 95° C.

EXAMPLE 4

Fractions of a polymer obtained as before are respectively treated by 50 parts by weight (by part of polymer by weight) of demineralized water, of an aqueous solution at 5 g. per litre of potassium hydroxide or sodium hydroxide, then dried in vacuum for 24 hours at room temperature.

The decomposition starting temperatures were:

° C.
For the polymer treated by demineralized water ____ 58
For the polymer treated by NaOH _____ 90
For the polymer treated by KOH _____ 95

EXAMPLE 5

Nitrogen is passed through a 1 litre reactor provided with a stirrer, a thermometer and a gas inlet and outlet, and exteriorly cooled by a mixture of petroleum ether and liquid nitrogen. A stream of ethylene in the reactor causes this gas to condense, 200 g. of liquid acetaldehyde, distilled and purified as in Example 2, are added and a temperature of from −120° C. and −130° C. is applied. 1 cm.³ of etherate of $BF_3$ is injected with a syringe, polymerization starts after a few minutes and the stirrer is blocked. The temperature is held below −120° C. for one hour and polymerization is stopped by the slow addition of 80 g. of triethylamine mixed with 600 g. of pyridine.

A fraction of this consistent paste (25 grams) is washed by hand five times with iced demineralized water (using two litres of water each time) and another 25 gram fraction is washed in the same manner with carbonated water at 20 g. of $Na_2CO_3 \cdot 10H_2O$ per litre (also using two litres of carbonated water each time). These fractions are, then dried in vacuum for 24 hours at a normal temperature then treated and tested as in Example 2.

Polymer washed with demineralized water, D.S.T.=75° C.
Polymer washed with $Na_2CO_3$, D.S.T.=100° C.

EXAMPLE 6

Polyacetaldehyde is prepared by the melting point method as described in Example 2. The resulting polymer is washed in demineralized water (500 parts by weight per part of weight of polymer): a sample of this polymer is dried as on Example 2. The decomposition starting temperature determined is 58° C. The whole remaining polymer is divided into three fractions which are dissolved respectively in pyridine, dimethylformamide and acetone, to obtain solutions at 5% by weight of polymer. Each solution is precipitated by water containing 5 g. per litre of the bases shown, then washed twice by an alkaline solution of the same concentration (using 500 parts by weight of solution per part by weight of polymer each time). The resulting polymers are dried for 24 hours at room temperature.

The decomposition starting temperatures are:

Polymer dissolved in: ° C.
Pyridine and treated by $Na_2CO_3$ _____ 105
Dimethylformamide and treated by $K_2CO_3$ _____ 85
Dimethylformamide and treated by $NaHCO_3$ _____ 105
Acetone and treated by $KHCO_3$ _____ 90

EXAMPLE 7

The pyridine solution of the polymer obtained in the preceding example was placed into a reactor permitting the flow of a current of nitrogen therethrough, having stirring means, and 700 parts of acetic anhydride were added.

The reactants were maintained in contact for 20 hours, during which time the solution gradually darkened.

At the end of this period it was poured into a saturated solution of sodium carbonate in water; the polymer was precipitated; it was recovered and thoroughly washed with water.

The decomposition starting temperature of the product obtained was 127° C.

The influence of the different factors in the treatments disclosed in this example will be better appreciated when it is pointed out that the decomposition starting temperature of the untreated polymer is 55° C. and that of polymer dissolved in pyridine and thereafter precipitated with water is about 65° C.

EXAMPLE 8

The conditions of Example 7 were exactly reproduced but the contact time between the reactants was extended to 33 days.

The same decomposition starting temperature was obtained.

EXAMPLE 9

The conditions of Example 7 were reproduced using a reaction duration of 96 hours, at the end of which the polymer decomposition starting temperature was 125° C.

The temperature was then brought to 60° C. and held for 18 hours. The decomposition starting temperature then falls to 105° C. After removing the degradation products by dissolving in acetone and precipitation with water again, the decomposition starting temperature was 122° C.

EXAMPLE 10

The conditions of Example 7 were reproduced but with the addition of 0.1 part of anhydrous sodium acetate, which is a known catalyst in acetylation reactions.

The decomposition starting temperature was again 127° C.

EXAMPLE 11

The polymer obtained by the crystal melting point method, as in Example 2, is washed 5 times by an aqueous solution at 20 g./litre of $Na_2CO_3$ (using 500 parts by weight of solution per part by weight of polymer each time), dried for 24 hours at room temperature in vacuum and dissolved in 19 parts of pyridine. 10 parts by weight of acetic anhydride with respect to the weight of polymer are added to the pyridinic solution. The vessel is closed and the reactives are maintained in contact at room temperature for 24 hours. The solution is divided into three fractions, the first, fraction A is precipitated using demineralized iced water, the precipitate being washed twice with demineralized water, using 500 parts by weight per part by weight of polymer each time. The second fraction B is precipitated with carbonated water containing 15 g. of $Na_2CO_3 \cdot 10H_2O$ per litre, then washed twice by a solution of the same concentration, 500 parts by weight of carbonated water per part by weight of polymer being used for each wash. The third fraction C is precipitated by a solution at 15 g. per litre of $(NH_4)_2CO_3$, then washed twice by the same solution (each time 500 parts by weight of solution per part by weight of polymer).

The first fraction A treated by demineralized water is divided into three parts, $a$, $b$ and $c$. The first ($a$) is kept as a control. Its decomposition starting temperature is 56° C. The second ($b$) is dissolved in 7.1 parts of ether containing 0.01 part of pyridine with respect to the weight of polymer. The solution is stirred for 18 hours at room temperature, then the ether is eliminated by distillation on a cold surface to leave polyacetaldehyde containing about 1% of pyridine. Its decomposition starting temperature is 62° C. The third part ($c$) is treated in the same manner as the second but replacing pyridine by diphenylamine. The decomposition starting temperature of the polymer is 64° C.

Heated to 138° C. or 160° C. in a nitrogen stream these three polymers ($a$, $b$, $c$) decompose in accordance with a law of first order giving $K_{138}$ of 4 and 5 and $K_{160}$ in the range of 10.

The decomposition starting temperature of the polymer of fraction ($c$) treated by ammonium carbonate is 70° C. and when this polymer is heated to 160° C. in nitrogen, its decomposition occurs without showing stabilization.

The decomposition starting temperature of the polymer of fraction ($b$) treated by $Na_2CO_3$ is 140° C. This polymer loses 17.7% of its weight in an hour at 160° C. and 28.7% at 180° C. Decomposition does not occur according to a law of first order; the product stabilizes by heating. After 24 hours of treatment at 160° C., 58.3% of the initial weight of a polymer remains losing 1.6% in an hour at 160° C. and 5.2% at 180° C. The decomposition starting temperature was found to be 175° C.

It can thus be seen that pyridine, diphenylamine or ammonium carbonate do not enable elastomer polyacetaldehyde to be stabilized by heating.

EXAMPLE 12

The three samples prepared according to Example 2 are heat-treated at 138° C. in a nitrogen stream, the loss in weight as a function of time being registered on a thermal balance. The first two samples decompose in accordance with a law of first order.

The sample washed with demineralized water gives a $k_{138}$ of 3.86; the sample washed with petroleum ether a $k_{138}$ of 5.68; the sample treated by the sodium carbonate solution does not decompose according to a law of first order. It loses 22% of its weight in one hour during the first hour attaining a D.S.T. of 110° C. After 6 hours of heating at 138° C. there still remains 39% of the initial weight of a polymer the decomposition rate of which is now only 6.4% per hour (D.S.T. of 120° C.); after 12 hours of heating there remains 31.5% of a polymer only losing 3.1% per hour at 138° C. in nitrogen (D.S.T.=136° C.)

If this fraction is subjected to heat treatment at 160° C. the loss in weight during the first hour is 54%. After 6 hours of treatment 16% of the initial weight of polymer remains. Its rate of decomposition is then 12.5% per hour at 160° C. (D.S.T.=134° C.).

EXAMPLE 13

A polymer obtained as described in Example 2 is divided into two fractions; the first fraction is washed 5 times with demineralized water by a turbo-stirrer using 50 parts by weight of water per part by weight of polymer. A sample of this first fraction is dried in vacuum at room temperature for 24 hours. The decomposition starting temperature obtained is 52° C. The second fraction is washed in the same fashion but with a solution of carbonated water at 5 g. per litre of $Na_2CO_3 \cdot 10H_2O$. The decomposition starting temperature of a dried sample is 102° C. The first fraction heated at 138° C. in a nitrogen stream decomposes according to a law of first order and gives a $k_{138}$ of 8.68. The second fraction does not decompose according to a law of first order, the loss in weight being 43% during 1 hour. After 6 hours 20% of a polymer remains which only loses 5% per hour (D.S.T.=123° C.).

EXAMPLE 14

The polymers of Example 3(A) and 3(B) are submitted to heat treatment under nitrogen at 138° and 160° C. respectively. Table I below gives the results obtained.

*Table I*

| | | | Loss of Weight, percent/h. | | | |
|---|---|---|---|---|---|---|
| Temperature, °C. | Length of treatment in hours | Yield, percent | 138° C. D.S.T. | | 160° C. D.S.T. | |
| Fraction treated by NaHCO₃ | | | | | | |
| ---- | ---- | 100 | 40 | 100° | 75 | 100° |
| 138 | 6 | 27 | 3 | 119° | | |
| 138 | 12 | 23.5 | 2.1 | 125° | | |
| 138 | 24 | 18.5 | 1.8 | 133° | | |
| 160 | 1 | 25 | | | 28 | 125° |
| 160 | 6 | 12.5 | | | 7.4 | 134° |
| 160 | 12 | 7.5 | | | 3.3 | 146° |
| FRACTION TREATED BY K₂CO₃ | | | | | | |
| ---- | ---- | 100 | 41.5 | 90° | 70.5 | 90° |
| 138 | 6 | 29.5 | 1.72 | 131° | | |
| 138 | 12 | 27 | 1.23 | 136° | | |
| 160 | 1 | 29.5 | | | 11.9 | 130° |
| 160 | 6 | 21 | | | 5.7 | 141° |
| 160 | 12 | 16 | | | 4.5 | 147° |
| FRACTION TREATED BY Li₂CO₃ | | | | | | |
| ---- | ---- | 100 | 90 | 85° | | |
| 138 | 0.5 | 33 | 82 | 90° | | |
| 138 | 1 | 10 | 40 | 106° | | |
| 138 | 3 | 5.5 | 15 | 110° | | |
| FRACTION TREATED BY LiOH | | | | | | |
| ---- | ---- | 100 | 77 | 95° | 94 | 95° |
| 138 | 1 | 23 | 69.5 | 103° | | |
| 138 | 3 | 4 | 12 | 117° | | |
| 160 | 1 | 6 | | | 16.7 | 127° |

EXAMPLE 15

The fractions of Example 4 treated by soda or potash are submitted to heat treatment at 138° C. or 160° C. in nitrogen.

The results obtained are given in Table II below.

*Table II*

| Fraction | Temperature of treatment in °C. | Length of treatment in hours | Yield, percent | $K_{138}$ | | $K_{160}$ | |
|---|---|---|---|---|---|---|---|
| Treated by demineralized water | | | 100 | 2.34 | | 6.14 | |
| | | | | Loss in weight, percent/h. | | | |
| | | | | 138° C. D.S.T. | | 160° C. D.S.T. | |
| Treated NaOH | | | | 45 | 90° | 79.5 | 90° |
| | 138 | 6 | 8 | 1.6 | 131° | | |
| | 160 | 1 | 20.5 | | | 56.1 | 106° |
| | 160 | 3 | 7.5 | | | 13.3 | 133° |
| Treated KOH | | | 100 | 35 | 95° | 69 | 95° |
| | 138 | 6 | 25 | 1.4 | 128° | | |
| | 138 | 12 | 23 | 0.8 | 134° | | |
| | 160 | 1 | 31 | | | 29 | 125° |
| | 160 | 6 | 17.5 | | | 5.7 | 145° |
| | 160 | 12 | 13.5 | | | 3.3 | 152° |

EXAMPLE 16

The fraction of Example 5 treated by demineralized iced water decomposed when heated at 138° C. according to a law of first order. The fraction treated by $Na_2CO_3$ is more stable and stabilizes further after heat treatment.

The results obtained are shown in Table III.

*Table III*

| Fraction | Temperature of treatment in ° C. | Length of treatment in hours | Yield, percent | $K_{111}$ | $K_{138}$ |
|---|---|---|---|---|---|
| Treated by demineralized water | | | 100 | 1.36 | 8.06 |

| | | | | Loss of weight, percent/h. | |
|---|---|---|---|---|---|
| | | | | 111° C. D.S.T. | 138° C. D.S.T. |
| Treated by $Na_2CO_3$ | | | 100 | 10 | 52  100° |
| | 138 | 3 | 15 | | 20  113° |

EXAMPLE 17

Table IV gives the results obtained by submitting samples of the polymers of Example 6 to heat treatment.

*Table IV*

| Polymer | Temp. of Treatment in ° C. | Length of Treatment in Hours | Yield, Percent | $K_{138}$ | $K_{160}$ |
|---|---|---|---|---|---|
| Initial sample before dissolution | | | 100 | 2.34 | 6.14 |

| | | | | Loss of Weight, Percent/h. | |
|---|---|---|---|---|---|
| | | | | 138 D.S.T. | 160 D.S.T. |
| After dissolution in pyridine and reprecipitation by $Na_2CO_3 \cdot 10 H_2O$ | | | 100 | 49   105° | 85   105° |
| | 138 | 3 | 18.5 | 18.9  114° | |
| | 138 | 6 | 14 | 2.4   133° | |
| | 160 | 1 | 15 | | 26.7  132° |
| | 160 | 6 | 9 | | 4.6   143° |
| After dissolution in dimethylformamide and reprecipitation by $K_2CO_3$ | | | 100 | 81.5  85° | 83   85° |
| | 138 | 1 | 18.5 | 5.4   121° | |
| | 138 | 3 | 17 | 2.9   128° | |
| | 138 | 6 | 16 | 0.8   135° | |
| | 160 | 0.5 | 18 | | 9.7   135° |
| | 160 | 1 | 17 | | 7.35  140° |
| | 160 | 6 | 13.75 | | 1.5   152° |
| After dissolution in dimethylformamide and reprecipitation by $NaHCO_3$ | | | 100 | 42    105° | 89   105° |
| | 138 | 3 | 24 | 29.2  110° | |
| | 138 | 6 | 13 | 1.2   134° | |
| | 160 | 1 | 17 | | 32.4  119° |
| | 160 | 3 | 10 | | 15    132° |
| | 160 | 6 | 8 | | 7     141° |
| After dissolution in acetone and reprecipitation by $KHCO_3$ | | | 100 | 76.75  90° | 77   90° |
| | 138 | 0.5 | 47 | 55.4  100° | |
| | 138 | 1 | 23.25 | 12.9  112° | |
| | 138 | 6 | 20 | 0.23  116° | |
| | 160 | 0.5 | 25.5 | | 11.8  132° |
| | 160 | 3 | 21 | | 4.75  143° |
| | 160 | 12 | 17.75 | | 0.3   156° |

EXAMPLE 18

The polymer obtained by the crystal melting method is washed with a sodium carbonate solution, dried, redissolved in pyridine, then treated for 24 hours by acetic anhydride at room temperature, the proportions being 1 part of acetic anhydride and 19 parts of pyridine for one part of acetaldehyde. The solution is divided into 8 parts then precipitated and washed as in Example 11, the first fraction being treated by demineralized water, the following fractions by solutions containing 10 g. per litre respectively of $K_2CO_3$, $Na_2CO_3 \cdot 10H_2O$, $KHCO_3$, $NaHCO_3$, NaOH, KOH and LiOH each washing being carried out by using 500 parts by weight of the washing solution per part by weight of polymer.

The decomposition starting temperatures are the following:

| | ° C. |
|---|---|
| Polymer treated by demineralized water | 53 |
| Polymer treated by $K_2CO_3$ | 135 |
| Polymer treated by $Na_2CO_3$ | 140 |
| Polymer treated by $KHCO_3$ | 130 |
| Polymer treated by $NaHCO_3$ | 130 |
| Polymer treated by NaOH | 135 |
| Polymer treated by KOH | 140 |
| Polymer treated by LiOH | 140 |

On the other hand the first fraction decomposes according to a law of first order, the others stabilize by heating.

Table V below gives the results obtained.

*Table V*

| Fraction | Temp. of Treatment in °C. | Length of Treatment in Hours | Yield, Percent | $K_{160}$ | | | D.S.T., degrees |
|---|---|---|---|---|---|---|---|
| Treated by demineralized water | | | 100 | 8.7 | | | 53 |

| | | | | Loss of Weight in percent/hour | | | |
|---|---|---|---|---|---|---|---|
| | | | | 160° C. | 180° C. | 200° C. | |
| Treated by $CO_3K_2$ | | | 100 | 9.7 | 16.3 | 33.6 | 135 |
| | 160 | 24 | 76.2 | 2 | 2.1 | 9.3 | 191 |
| Treated by $CO_3Na_2$ | | | 100 | 16.1 | 42.6 | 69.7 | 140 |
| | 160 | 24 | 41.3 | 2.3 | 11.4 | 35.8 | 162 |
| Treated by $CO_3HK$ | | | 100 | 9.8 | 18.6 | 73.1 | 130 |
| | 160 | 24 | 26.3 | 2.1 | 4.6 | 21.4 | 164 |
| Treated by $CO_3HNa$ | | | 100 | 13.7 | 32.6 | 60 | 130 |
| | 160 | 24 | 49.2 | 1.8 | 6.5 | 26.4 | 160 |
| Treated by NaOH | | | 100 | 16.8 | 29.4 | 55.5 | 135 |
| | 160 | 24 | 47.8 | 2.8 | 12.7 | 35.4 | 159 |
| Treated by KOH | | | 100 | 8.2 | 14.9 | 35.1 | 140 |
| | 160 | 24 | 61.3 | 0.6 | 3 | 18.2 | 172 |
| Treated by LiOH | | | 100 | 23.6 | 43.5 | 80.5 | 140 |
| | 160 | 24 | 85 | 5.9 | 14.5 | 39.2 | 156 |

EXAMPLE 19

Acetaldehyde is polymerized by etherate of $BF_3$ as described in Example 5. The paste recovered after addition of 80 g. of triethylamine and 600 g. of pyridine is dissolved in 1120 g. of pyridine. To 10 parts by weight of this solution is added one part by weight of acetic anhydride. After contact at 25° C. for 24 hours the solution is divided into three fractions, the first being precipitated by iced demineralized water; the second is similarly treated by a solution of $Na_2CO_3$ at 10 g. per litre; and the third by a solution of $KHCO_3$ at 10 g. per litre, using 500 parts by weight of precipitated polymer for washing. The first fraction decomposes according to a law of first order, the second and third are stabilized by heating in nitrogen. The results obtained are shown in Table VI.

vacuum. The fraction treated by NaOH having a decomposition starting temperature of 125° C. loses 30.1% at 160° C. in 1 hour in nitrogen; after 24 hours of treatment at 160° C. in vacuum 16.5% of polymer remains which loses 35.2% of its weight in 1 hour at 180° C. in nitrogen and 66.5% at 200° C. in 1 hour in nitrogen. The fraction treated by $KHCO_3$ having a decomposition starting temperature of 130° C. loses 14.5% of its weight in one hour when heated in nitrogen at 160° C. and 21.8% at 180° C. After treatment in vacuum for 24 hours at 160° C. there remains 64.3% of a polymer which loses 2.5% at 160° C. for 1 hour in nitrogen, 5.5% at 180° C., 25% at 200° C.

The polymers so obtained can be stabilized in air by amine or phenolic anti-oxidants. Decomposition rates in air similar to decomposition rates in nitrogen are then obtained.

It is understood that the present invention has simply been described by way of example and without limitation

*Table VI*

| Fraction treated by demineralized water D.S.T.=75° C. | | | | | | |
|---|---|---|---|---|---|---|
| Temp., °C. | Length of Treatment in hours | Yield, Percent | Loss of Weight Percent/hour | | | D.S.T., degrees |
| | | | 160° C. | 180° C. | 200° C. | |
| | | 100 | 55.8 | 94 | 98.6 | 75 |

| Fraction treated by $Na_2CO_3$ D.S.T.=135° C. | | | | | | |
|---|---|---|---|---|---|---|
| | | 100 | 37.8 | 67.6 | 86.6 | 135 |
| 160 | 8 | 19.5 | | 34.8 | 63.5 | 141 |

| Fraction treated by $KHCO_3$ D.S.T.=130° C. | | | | | | |
|---|---|---|---|---|---|---|
| | | 100 | 22.6 | 53.6 | 77.5 | 130 |
| 160 | 8 | 37 | | 26 | 48.3 | 152 |

EXAMPLE 20

A polymer of acetaldehyde obtained by the melting point method is treated as described in Example 18, precipitation and washing being carried out by utilizing 500 parts by weight of a solution of NaOH or $NaHCO_3$ at 10 g. per litre per part by weight of precipitated polymer. The polymer is dried for 24 hours in vacuum at room temperature and submitted to heat treatment in and that useful alterations may be brought to it without departing from the scope of the invention.

What is claimed is:

1. Process for the thermal stabilization of polymers consisting of polyacetaldehyde elastomers of high molecular weight comprising treating said elastomers with a dissolving amount of pyridine, allowing the resulting solution to stand at room temperature, adding an alkaline aqueous solution selected from the group consisting of alkaline metal hydroxide, carbonates and bicarbonates solutions in an amount at least sufficient for precipitating effect, then separating the precipitated polymers from said solution whereby a stabilized polymer having a decomposition starting temperature of at least 85° C. is obtained.

2. Process for the thermal stabilization of polymers consisting of polyacetaldehyde elastomers of high molecular weight comprising treating said elastomers with a dissolving amount of pyridine, allowing the resulting solution to stand at ambient temperature, adding an aqueous solution of sodium carbonate in an amount at least sufficient for precipitating effect, then separating precipitated polymer from said solution, whereby a stabilized elastomer having a decomposition starting temperature of at least 105° C. is obtained.

3. Process for the thermal stabilization of polymers consisting of polyacetaldehyde elastomers of high molecular weight comprising treating said elastomers with a dissolving amount of pyridine, allowing the resulting solution to stand at ambient temperature, adding an aqueous solution of sodium bicarbonate in an amount at least sufficient for precipitating effect, then separating precipitated polymer from said solution, whereby a stabilized elastomer having a decomposition starting temperature of at least 105° is obtained.

4. Process for the thermal stabilization of polymers consisting of polyacetaldehyde elastomers of high molecular weight comprising treating said elastomers with a dissolving amount of pyridine in the presence of acetic anhydride, allowing the solution to stand for a period of from 20 hours up to several days, treating with an alkaline aqueous solution selected from the group consisting of alkaline metal hydroxides, carbonates and bicarbonates solutions in an amount at least sufficient for destroying the acetic anhydride and for precipitating said polymers, then separating the precipitated elastomers whereby a stabilized elastomer having a decomposition starting temperature of at least 125° C. is obtained.

5. Process for the thermal stabilization of polymers consisting of polyacetaldehyde elastomers of high molecular weight comprising treating said elastomers with a dissolving amount of pyridine in the presence of acetic anhydride, allowing the solution to stand for a period of from 20 hours up to several days, treating with an aqueous solution of sodium carbonate in an amount at least sufficient for destroying the acetic anhydride and for precipitating said polymers, then separating the precipitated elastomers, whereby a stabilized elastomer having a decomposition starting temperature of at least 125° C. is obtained.

6. Process for the thermal stabilization of polymers consisting of polyacetaldehyde elastomers of high molecular weight comprising treating said elastomers with a dissolving amount of pyridine in the presence of acetic anhydride, allowing the solution to stand for a period of from 20 hours up to several days, treating with an aqueous solution of sodium bicarbonate in an amount at least sufficient for destroying the acetic anhydride and for precipitating said polymers, then separating the precipitated elastomers, whereby a stabilized elastomer having a decomposition starting temperature of at least 125° C. is obtained.

7. In a process for the thermal stabilization of polymers consisting of polyacetaldehyde elastomers by treating said polymers with pyridine and acetic anhydride, the improvement consisting in treating the reaction medium comprising polyacetaldehyde dissolved in pyridine in the presence of acetic anhydride with an alkaline aqueous solution selected from the group consisting of alkaline metal hydroxides, carbonates and bicarbonates solutions in an amount at least sufficient for destroying the acetic anhydride and for precipitating said polymer, and recovering said precipitate, whereby stabilized pure elastomers having a decomposition starting temperature of at least 125° C. are obtained.

8. In a process for the thermal stabilization of polymers consisting of polyacetaldehyde elastomers by treating said polymers with pyridine and acetic anhydride, the improvement consisting in treating the reaction medium, comprising polyacetaldehyde dissolved in pyridine in the presence of acetic anhydride, with an aqueous solution of sodium carbonate in an amount at least sufficient for destroying the acetic anhydride and for precipitating said polymer, and recovering said precipitate, whereby stabilized pure elastomers having a decomposition starting temperature of at least 125° C. are obtained.

9. In a process for the thermal stabilization of polymers consisting of polyacetaldehyde elastomers by treating said polymers with pyridine and acetic anhydride, the improvement consisting in treating the reaction medium, comprising polyacetaldehyde dissolved in pyridine in the presence of acetic anhydride, with an aqueous solution of sodium bicarbonate in an amount at least sufficient for destroying the acetic anhydride and for precipitating said polymer, and recovering said precipitate, whereby stabilized pure elastomers having a decomposition starting temperature of at least 125° C. are obtained.

10. Process according to claim 1 wherein said polymers are further heat treated at a temperature of between 100–300° C.

11. Process according to claim 2 wherein said polymers are further heat treated at a temperature of between 100–300° C.

12. Process according to claim 7 wherein said polymers are further heat treated at a temperature of between 100–300° C.

13. Process according to claim 8 wherein said polymers are further heat treated at a temperature of between 100–300° C.

14. Process according to claim 9 wherein said polymers are further heat treated at a temperature of between 100–300° C.

15. The elastomeric polymer of acetaldehyde prepared in accordance with the process of claim 1.

16. The acetic anhydride-modified elastomeric polymer of acetaldehyde prepared in accordance with the process of claim 7.

17. The elastomeric polymer of acetaldehyde prepared in accordance with claim 10.

18. The acetic anhydride-modified elastomeric polymer prepared in accordance with claim 12.

References Cited by the Examiner

UNITED STATES PATENTS

| | | | |
|---|---|---|---|
| 2,989,509 | 6/1961 | Hudgin et al. | 260—67 |
| 3,001,966 | 9/1961 | Funck et al. | 260—67 |
| 3,174,948 | 3/1965 | Wall et al. | 260—45.8 |

SAMUEL H. BLECH, *Primary Examiner.*

WILLIAM H. SHORT, *Examiner.*

R. LYON, *Assistant Examiner.*